Nov. 3, 1970          L. W. METZ ETAL            3,537,215
         PRECISION ROTARY LOCATION OF A CRANKSHAFT IN AN
                AUTOMATIC CRANKPIN GRINDING MACHINE
Filed Dec. 4, 1967                            2 Sheets-Sheet 1
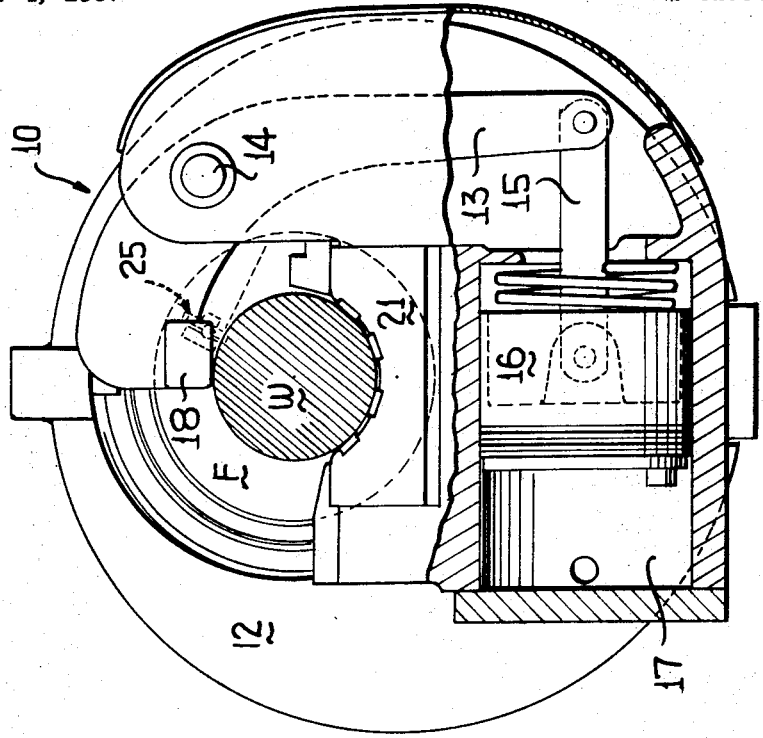
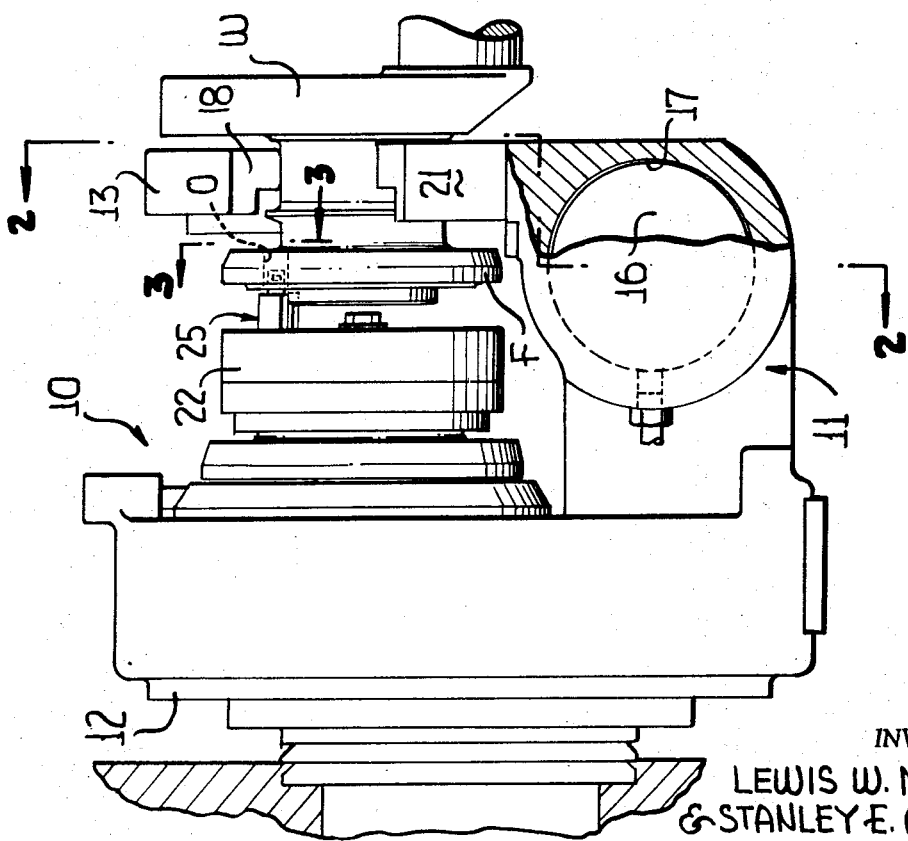
INVENTORS
LEWIS W. METZ
& STANLEY E. GRUBE
BY
Mason, Porter, Diller & Brown
ATTORNEYS

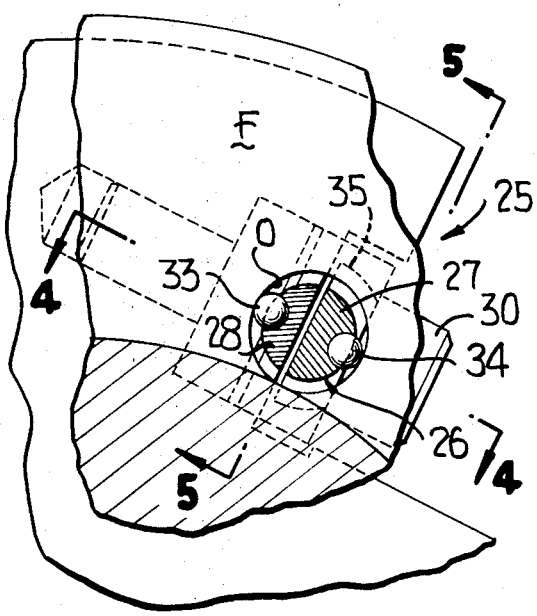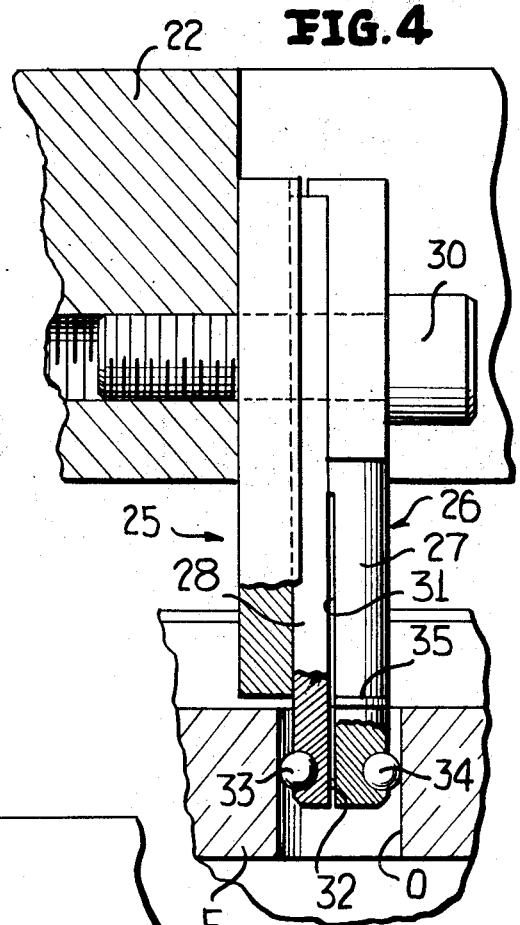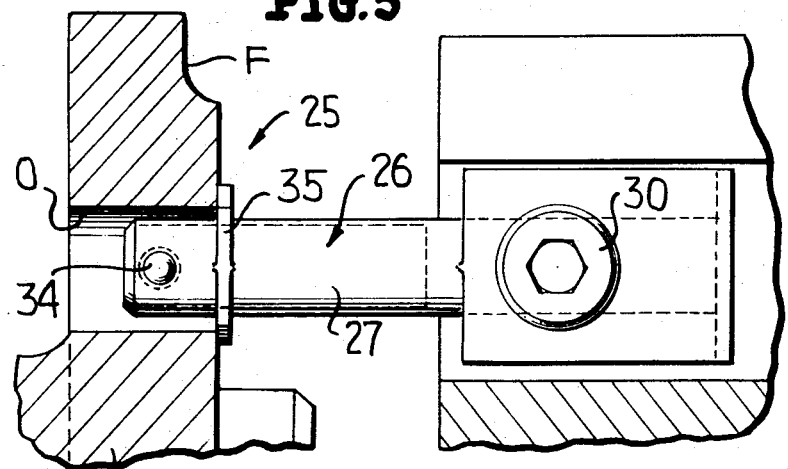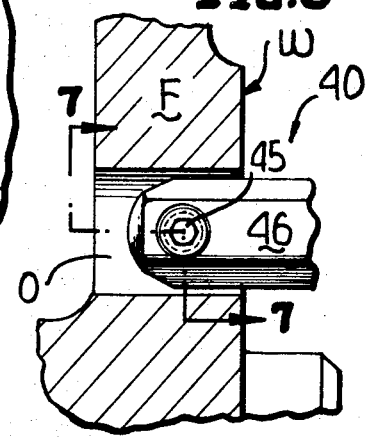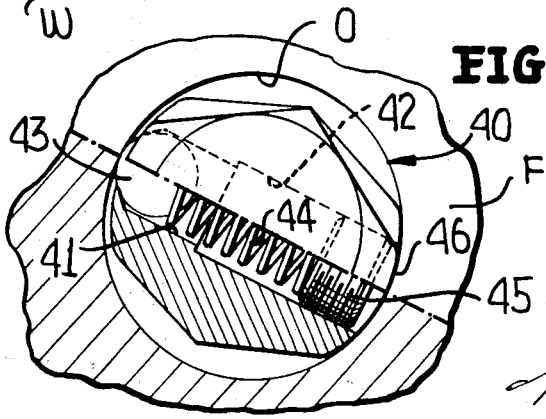

United States Patent Office 3,537,215
Patented Nov. 3, 1970

3,537,215
PRECISION ROTARY LOCATION OF A CRANK-SHAFT IN AN AUTOMATIC CRANKPIN GRINDING MACHINE
Lewis W. Metz and Stanley E. Grube, Waynesboro, Pa., assignors to Litton Industries, Inc., a corporation of Delaware
Filed Dec. 4, 1967, Ser. No. 687,865
Int. Cl. B25b 5/00
U.S. Cl. 51—237                              12 Claims

ABSTRACT OF THE DISCLOSURE

This disclosure is directed to means for effecting the precise rotary location of a crankshaft in an automatic crankpin grinding machine wherein the locating function is dependent upon a locating hole, notch or similar recess in a flange of the crankshaft. The means for effecting the rotary location of the crankshaft is a locating pin which extends axially from an index plate, and includes diametrically opposite means for engaging opposite surface portions of the locating hole. The distance between the engaging means of the pin is slightly greater than the diameter of the locating hole whereupon a turning force or moment is applied to one side of the locating hole to both rotate the crankshaft and urge the opposite side of the hole into firm engagement with the locating pin. Resilient means are preferably provided for applying the turning moment to the crankshaft. The crankshaft is assured of precision rotary location for the grinding of all pins without repeating the operation after each index movement.

---

During the grinding of crankpins of crankshafts, particularly in an automatic crankpin grinding machine, it is necessary that each crankpin be accurately positioned in axial alignment with the work drive spindle. Conventional automatic rotary indexing mechanisms provide a reasonably accurate rotary index from one crankpin to another, but they do not necessarily provide firm contact between the rotary locating means and the work locating surface of the crankshaft. In the past this has been accomplished by applying a turning force directly to the crankpins by a preliminary advance movement of a workrest shoe or by yielding means for applying the locating force against the crankpin. Such devices are effective to perform rotary indexing functions, but the precision thereof is not completely satisfactory.

The present invention is directed to the precise rotary location of a crankshaft in which the locating surface of the crankshaft is a locating hole, notch or similar recess in the crankshaft flange. The locating mechanism of this invention consists of an axially extending locating pin carried by an index plate having an overall dimension greater than that of the locating hole diameter. A locating surface of the pin is rigid while a diametrically opposite bearing surface is resiliently biased outwardly of the pin axis. During a locating operation the locating pin is maintained in a stationary position and the crankshaft is moved endwise such that the locating pin is received in the locating hole of the crankshaft flange. As the locating pin enters the locating hole the locating surface of the pin contacts the locating surface of the hole and determines the angular position of the hole and each crankpin. This contact is maintained by the contact between the less rigidly suported bearing surface of the pin against an opposite surface portion of the hole to thereby maintain alignment between the axes of the crankpins and the drive spindle. Furthermore, since the distance between the locating and bearing surfaces of the locating pin is slightly greater than the diameter of the crankshaft locating hole the resilience of the locating pin may, depending upon the positions of the crankpin and spindle, additionally produce a slight turning force or moment which turns the crankshaft to accurately align the crankpin axis relative to the spindle axis in the course of which firm engagement is effected between the locating surface of the locating hole and the locating surface of the locating pin. With this arrangement the locating force is applied directly against the locating hole surface, as opposed to being applied through a crankpin as is now the case in most rotary locating mechanisms. Furthermore, the force applied to effect this precise locating function is very slight, and since it is applied directly to the locating hole it does not tend to deflect the crankshaft as is true where the locating force is applied directly to a crankpin. Moreover, the locating mechanism is self-limiting in that excessive rotation of the crankshaft is precluded and automatically stopped upon the firm engagement of the locating surface of the hole against the fixed element of the locating pin. Finally, this precision locating function occurs only when the crankshaft is placed in the machine, and it eliminates the necessity of performing a precision rotary locating operation of the crankshaft each time a new crankpin is indexed into alignment with the driving spindle.

It is therefore, a primary object of the present invention to provide a novel locating mechanism for effecting precise rotary location of a crankshaft in an automatic crankpin grinding machine wherein the crankshaft includes a flange having a locating hole, the mechanism including an index plate carrying a locating pin for entering the locating hole of the crankshaft flange, the pin including locating and bearing surface means for contacting against and co-acting with diametrically opposite surfaces of the hole, and biasing means for imparting a turning moment to the crankshaft through the co-acting surfaces when angular misalignment is present between the crankpins and spindle to impart a slight rotary movement to the crankshaft and precisely locate the same in an associated grinding machine.

A further object of this invention is the provision of a novel mechanism of the type aforesaid wherein the locating pin includes a pair of spaced terminal end portions, the locating and bearing surface means are ball-like elements carried by the terminal end portions of the pin, and at least one of the terminal end portions is resilient to impart the turning moment or force to an associated crankshaft flange through its locating hole.

A further object of this invention is to provide a novel locating mechanism of the type heretofore described wherein the locating pin includes a terminal end portion provided with a transverse bore, means closing an end of the bore, the contacting means being a rigid ball-shaped element positioned opposite the closing means, and the biasing means is a spring housed between the closing means and the ball-shaped element for continually biasingly urging the latter partially outwardly of the bore to impart the turning moment to an associated crankshaft.

With the above and other objects in view that will hereinafter appear, the nature of the invention will be more clearly understood by reference to the following detailed description, the appended claimed subject matter, and the several views illustrated in the accompanying drawings.

In the drawings:

FIG. 1 is a fragmentary side elevational view of an automatic crankpin grinding machine, and illustrates an index plate carrying a locating mechanism which is partially received within a locating hole of a crankshaft flange.

FIG. 2 is a sectional view taken generally along line

2—2 of FIG. 1 with parts broken away for clarity, and illustrates a conventional crankshaft clamping fixture in the closed position thereof.

FIG. 3 is a highly enlarged fragmentary sectional view taken generally along line 3—3 of FIG. 1, and more clearly illustrates the locating mechanism partially received within the locating hole of the crankshaft flange.

FIG. 4 is a fragmentary sectional view taken generally along line 4—4 of FIG. 3, and illustrates a two-piece locating pin of the locating mechanism carrying diametrically disposed ball-like locating and bearing elements.

FIG. 5 is a fragmentary sectional view taken generally along line 5—5 of FIG. 3, and illustrates a collar for limiting the extent of introduction of the locating pin into the hole of the crankshaft flange.

FIG. 6 is a fragmentary side elevational view of another locating mechanism of this invention, and illustrates the mechanism of this invention, and illustrates the mechanism operatively positioned within a locating hole of a flanged crankshaft.

FIG. 7 is an enlarged sectional view taken generally along line 7—7 of FIG. 6, and more clearly illustrates a spring for urging a ball-shaped bearing element into bearing engagement against a surface of the hole for imparting a turning moment to the crankshaft.

A portion of an automatic crankpin grinding machine 10 is illustrated in FIGS. 1 and 2 of the drawings, and includes a clamping fixture 11 conventionally attached to a rotatable work drive spindle 12. The clamping fixture 11 includes an arm 13 (FIG. 2) pivotally mounted medially its ends by a pivot pin 14. One end of the arm 13 is pivotally connected to a piston rod 15 which is in turn connected to a piston 16 mounted for reciprocal movement in a cylinder 17. An opposite end portion of the arm 13 carries a work engaging gripping member 18 which holds the end main journal of a workpiece W in firm contact with a throw block 21. In the illustrated embodiment of the invention the workpiece W is a crankshaft having a flange F provided with a locating hole or opening O, or similar equivalent means as, for example, a notch or recess (not shown).

The clamping fixture 11 includes an index plate 22 rotatably mounted therein in generally axial alignment with the crankshaft W and in eccentrically offset relation to the axis of rotation of the spindle 12 and the clamping fixture 11. The index plate 22 carries the novel locating mechanism of this invention which is generally designated by the reference character 25. The locating mechanism 25 is best illustrated in FIGS. 3 through 5 of the drawings, and includes a locating pin or stud 26 extending axially from the index plate 22 in a position to enter the locating hole O in the flange F of the crankshaft W. The locating pin 26 is of a two-piece construction defined by a pair of generally semi-cylindrical elements 27, 28 which at ends thereof remote from the flange F are secured to the index plate 22 by a screw 20 in the manner best illustrated in FIG. 4 of the drawings. Free terminal ends (unnumbered) of the elements 27, 28 are normally maintained in spaced relationship to each other, as indicated by the gap (unnumbered) between opposing flat surfaces 31, 32 thereof. The element 28 is constructed from resilient metallic material, such as spring steel, and carries a ball-like rigid metallic bearing or contacting element 33, the exposed surface of which defines means for contactingly bearing against a surface (unnumbered) of the locating opening O. The remaining element 27 of the pin 26 is constructed from rigid metallic or non-metallic material and similarly carries a ball-like, rigid, metallic, locating element 34 having an exposed surface (unnumbered) which defines locating means for locatingly engaging a diametrically opposite surface (unnumbered) of the opening O, in the manner best illustrated in FIGS. 3 and 4 of the drawings. A collar 35 carried by the element 27 of the pin 26 limits the extent of insertion of the terminal end portions (unnumbered) of the pin into the opening O, in the manner best illustrated in FIG. 3 of the drawings.

When the crankshaft W is placed in the machine 10 the locating hole O and the locating pin 26 of the locating mechanism 25 are in approximate axial alignment and in approximate arcuate relationship. Upon the movement of the crankshaft W either manually or automatically endwise toward the locating mechanism 25 the pin 26 progressively enters the hole O during which time the ball-shaped elements 33, 34 contact generally diametrically opposite surfaces of the hole O. Assuming the axis of the hole O and the axis of the pin 26 are not exactly aligned but that the arcuate relationship between the pin 26 and the hole O is proper, the ball-shaped elements 33, 34 contact surfaces of the hole O which are generally diametrically opposite to each other. The inherent resilience of the now-deflected element 28 urges the locating hole O into firm contact with the locating element 34 to effect alignment between the axes of a crankpin and the spindle. In other words, the locating or exposed surface of the locating element 34 and the surface of the locating hole O contacted thereby represent the axis of the spindle 12 and the axis of the crankpin whch is to be ground, and when firm contact is achieved between these surfaces exact alignment of any axially misaligned pins relative to the spindle is effected.

If the locating hole O is slightly angularly offset either clockwise or counterclockwise as viewed in FIG. 3 relative to the locating pin 26 the inherent resilience of the deflected element 28 as it enters the hole O imparts a turning force or moment against the side of the hole O engaged by the bearing element 33 with the opposite point of contact between the locating surface and the locating element 34 serving as a fulcrum to cause the angularly misaligned crankshaft W to rotate or turn to a position at which the crankpin which is to be ground is in precise angular and axial alignment with the spindle 12. The crankshaft W is, of course, held in this position by the resilient biasing force of the element 28 engaging one side of the hole O by the bearing element 33 whereby the diametrically opposite side of the hole O is held in firm engagement with the exposed surface of the locating element 34. The turning force or moment applied by the resilient element 28 through the bearing engagement between the bearing element 33 and the hole O is relatively slight and since it is applied directly to the surface of the hole O, it does not tend to deflect the crankshaft as is sometimes true in conventional mechanisms wherein the locating force is applied directly to the crankpin which is to be ground. In fact, the locating mechanism 25 is self-limiting in that the rigid element 27 and its associated locating element 34 prevents rotary movement of the crankshaft by the resilient element 28 beyond a position at which the elements 33, 34 contact diametrically opposite sides of the locating hole O. For example, if the angular relationship between the pin 26 and the hole O is precisely that necessary for proper grinding, the entry of the pin 26 into the hole O does not produce a turning moment to the crankshaft but would simply depress the element 28. However, if arcuate misalignment is present the force applied by the resilient element 28 is sufficient to turn the crankshaft W to a position at which the element 28 functions solely to maintain the hole O firmly against element 34, but further rotation of the crankshaft W is automatically precluded.

From the foregoing it should be noted that in order to provide the desired alignment between the axis of the work drive spindle 12 and each crankpin axis the locating mechanism 25 requires two coacting locating elements, the more rigid locating element 34 being fixed and representing the fixed axis of the work drive spindle adapted for engagement with the locating surface of the hole O, while the other element 33 must therefore be resiliently movable as it represents the axis of a crankpin which must be moved to align the axis of each crankpin and the work drive spindle axis. Thus, the more rigid locating element 34 determines or establishes the locating point while the other element 33 carried by the less rigid element 28 assures contact between the diametrically opposite surfaces of the hole O by exerting a force against the surface of the hole O contacted by the element 33. It should be particularly noted that the maximum distance between the elements 33, 34 is greater than the diameter of the hole O and if each of the members were of equal rigidity or resilience they would move equally toward one another upon entering the hole O. This would not produce the alignment desired and it is therefore necessary that only one of the elements 33 should move since the other element 34 represents the fixed axis of the spindle 12 and must remain stationary. By constructing the elements 27, 28 of different rigidity, the less rigid element 28 will deflect when the pin enters the hole O and thereafter the deflecting member will assure firm contact between the locating surface of the hole O in contact with the locating element 34 of the more rigid member 27.

Referring now to FIGS. 6 and 7 of the drawings, another locating mechanism is shown carried by an index plate (unnumbered) corresponding to the index plate 22 of FIG. 1. The locating mechanism of FIGS. 6 and 7 includes a one-piece rigid metallic locating stud or pin 40 constructed of relatively rigid material. A terminal end portion (unnumbered) of the pin 40 is provided with housing means in the form of a transverse bore 41 and a threaded counterbore 42. A rigid ball-shaped bearing element 43 is partially seated within the bore 41, and a surface thereof (unnumbered) projects outwardly of the bore 41 and engages against a surface portion of the locating hole O of the crankshaft flange F. Biasing means in the form of a spring 44 housed between a threaded member 45 and the bearing element 43 normally urges the latter to the left as viewed in FIG. 7. As opposed to the ball-shaped locating element 34 of the pin 26, the pin 40 includes a rounded locating surface 46 positioned diametrically opposite the exposed surface of the ball-shaped element 43. As in the case of the elements 33, 34 of the pin 26, the maximum distance between the exposed surface of the element 43 and the locating surface 46 of the pin 40 is greater than the maximum diameter of the opening O. Thus, upon endwise movement of the crankshaft to the right as viewed in FIG. 6 the spring 44 and the ball 43 in the pin 40 impart a shifting movement and/or a turning force or turning moment to the flange F through the contacting surface portions of the hole O resulting in a precise alignment of the crankshaft W in the manner heretofore described relative to the locating mechanism 25.

While in each of the two locating mechanisms heretofore described the locating pins 26, 40 are operative in conjunction with perfectly smooth cylindrical locating holes O, it is to be understood that by a minor modification of the locating pins the same can be used in conjunction with conventional threaded holes of crankshaft flanges. In most cases the crankshaft flanges are provided with a special locating hole specifically formed in the flange of the crankshaft for the purpose of locating successive crankpins in axial alignment with the spindle. The same flanges also have a series of angularly spaced threaded holes which are used to attach the crankshaft to a transmission. By reaming one of these holes for accuracy the same may be used for precision locating in the manner heretofore described relative to the special locating hole O. However, in this case the ball-shaped elements 33, 34, 43 would not be as satisfactory for engaging the threads at one side of the threaded hole as compared to, for example, a longer axially extending surface such as the surface 46 of the locating pin 40 which would contact more than a single thread and would not be adversely effected by the space between adjacent threads. Therefore, in lieu of the ball-shaped element 43 of the locating pin 40, the same could be replaced by a generally cylindrical-shaped element having an axis disposed parallel to the longitudinal axis of the pin 40 with a cylindrical surface portion thereof being exposed outwardly of the bore 41 which would, of course, be appropriately altered to receive the cylindrical bearing element.

A like locating mechanism could be constructed in much the same manner as the locating pin 26 except that the ball-shaped element 33 would be eliminated and the outer cylindrical surface of the element 28 would function as the bearing or contacting surface which would engage the threaded hole. The ball-shaped element 33 and its associated socket would also be eliminated. In lieu of the latter-described construction, the sockets (unnumbered) which receive the ball-shaped elements 33, 34 of the locating pin 26 could be formed as semi-cylindrical slots disposed in parallelism to the pin axis and opening outwardly through the cylindrical surfaces of the elements 27, 28. A pair of cylindrical contacting or bearing elements could then be welded or otherwise secured in the grooves with cylindrical portions thereof projecting radially outwardly beyond the surfaces of the elements 27, 28 just as the elements 33, 34 project beyond these elements to function in a similar manner.

While preferred forms and arrangement of parts have been shown in illustrating the invention, it is to be clearly understood that various changes in details and arrangement of parts may be made without departing from the spirit and scope of the invention as defined in the appended claimed subject matter.

We claim:

1. A mechanism for the rotary location of a crankshaft in a machine tool having a work drive spindle, by utilizing as a locating surface, one side of a sole or similar recess in a flange of the crankshaft comprising an index plate for locating crankpins of a crankshaft in an approximate angular position, a locating pin carried by the index plate for entering the locating hole of the crankshaft, said locating pin including locating means for contacting against a locating surface of the locating hole, said locating pin further including means for bearing against and co-acting with another surface of the locating hole, and said first and second means being relatively movable and being normally spaced from each other a distance greater than the diameter of the locating hole whereupon the insertion of the locating pin into the locating hole shifts and/or imparts a turning moment to the crankshaft through the locating hole until the locating surface of said hole is in firm contact with the locating means of said locating pin to effect precision alignment between the axes of a crankpin and said spindle.

2. The mechanism as defined in claim 1 including means for resiliently urging the locating surface of the locating hole into contact with said locating means.

3. The mechanism as defined in claim 1 wherein said locating and bearing means are positioned diametrically opposite each other for engaging opposite sides of said locating hole.

4. The mechanism as defined in claim 2 wherein said means are positioned diametrically opposite each other for engaging opposite sides of said locating hole.

5. The mechanism as defined in claim 2 wherein at least one of said means is a rigid ball-shaped element.

6. The mechanism as defined in claim 2 wherein at least one of said means is a rigid elongated generally semi-cylindrical surface.

7. The mechanism as defined in claim 2 wherein said locating pin includes a pair of spaced terminal ends, said locating and bearing means are carried by said terminal ends, and said resilient means is defined by the construction of at least one of said terminal ends from resilient material.

8. The mechanism as defined in claim 2 wherein said locating pin includes a terminal end carrying said means, means in said terminal end partially housing one of said means, and said resilient means being positioned in said housing means for continuously urging said one means partially outwardly of said housing means.

9. The mechanism as defined in claim 7 wherein at least one of said means is a rigid ball-shaped element.

10. The mechanism as defined in claim 8 wherein at least one of said means is a rigid ball-shaped element.

11. The mechanism as defined in claim 8 wherein said housing means is a transverse bore in said terminal end, means closing an end of said bore, one of said locating and bearing means being a rigid ball-shaped element positioned opposite said closing means, and said resilient means is a spring housed between said closing means and said ball-shaped element for continually urging the latter partially outwardly of said bore.

12. A mechanism for the rotary location of a crankshaft in a machine tool having a work drive spindle by utilizing as a locating means, oppositely disposed surfaces on a crankshaft comprising a rotatable index plate for locating crankpins of a crankshaft in an approximate angular position, a rigid locating member carried by the index plate for engaging one of said surfaces of the crankshaft in response to relative axial movement between said crankshaft and said index plate, and a resilient locating member on said index plate for engaging the other of said surfaces likewise in response to relative axial movement between said crankshaft and said index plate, the distance between said surfaces being less than the distance between said locating members, so that when said locating members engage said surfaces, said resilient member is deflected and applies a rotating force against the adjacent locating surface for rotating said crankshaft and urging the other locating surface against said rigid locating member.

References Cited
UNITED STATES PATENTS

| | | | |
|---|---|---|---|
| 2,940,227 | 6/1960 | Flohr | 51—237 |
| 3,334,449 | 8/1967 | Price | 51—237 |

HAROLD D. WHITEHEAD, Primary Examiner